United States Patent
Sakuma et al.

(10) Patent No.: US 7,208,188 B2
(45) Date of Patent: Apr. 24, 2007

(54) METHOD OF PRODUCING A PRESS-MOLDED DRIED FOOD MATERIAL

(75) Inventors: Toshio Sakuma, Nagano (JP);
Masakazu Matsuda, Nagano (JP)

(73) Assignees: Nippon Freeze Drying Co, Ltd. (JP);
Japan and Asahi Food & Healthcare Ltd. (JP)

( * ) Notice: Subject to any disclaimer, the term of this patent is extended or adjusted under 35 U.S.C. 154(b) by 0 days.

(21) Appl. No.: 10/888,548

(22) Filed: Jul. 8, 2004

(65) Prior Publication Data
US 2005/0084576 A1 Apr. 21, 2005

(30) Foreign Application Priority Data

| Oct. 16, 2003 | (JP) | ............................. 2003-356603 |
| Jan. 5, 2004 | (JP) | ............................. 2004-000642 |
| Jul. 5, 2004 | (JP) | ............................. 2004-198595 |

(51) Int. Cl.
*A23C 1/08* (2006.01)

(52) U.S. Cl. .................. 426/385; 426/509; 426/512

(58) Field of Classification Search ................ 426/385, 426/509, 512
See application file for complete search history.

(56) References Cited

U.S. PATENT DOCUMENTS

| 4,088,790 A | * | 5/1978 | Bevan et al. ................ 426/96 |
| 4,233,327 A | * | 11/1980 | Ando et al. ................ 426/242 |
| 4,251,923 A | * | 2/1981 | Kuri ............................. 34/412 |
| 5,955,130 A | * | 9/1999 | Gagliardi et al. ........... 426/241 |

FOREIGN PATENT DOCUMENTS

| JP | A-55-165758 | | 12/1980 |
| JP | 63-042664 | * | 2/1988 |
| JP | 02-016960 | | 1/1990 |

(Continued)

OTHER PUBLICATIONS

"Notification of Reasons for Refusal" issued by Japanese Patent Office Japanese Patent Application No. JP2004-198595, Feb. 7, 2005 (English translation of Notification attached).

(Continued)

*Primary Examiner*—Anthony Weier
(74) *Attorney, Agent, or Firm*—Jack Schwartz & Associates (57) ABSTRACT

A molded dried food material which can be preserved at normal temperature, exhibits favorable rehydrating property with full of voluminous feeling when rehydrated, maintaining excellent taste, color and eat feeling without permitting the shape to be collapsed. A method of producing a dried food material comprises the steps of blanching a food material to be treated to obtain a blanched food material; mixing a vehicle to the blanched food material to obtain a vehicle-mixed food material; drying the vehicle-mixed food material with the hot air until the weight reduces to no less than 20% but no more than 70% to obtain a rehydration dried food material; press-molding the rehydration dried food material to obtain a press-molded food material; and freeze-drying the press-molded food material to obtain a freeze-dried food material; wherein the press-molding process to press down the freeze-dried food material with a force which can be rehydrated back to a sufficient degree when rehydrated.

6 Claims, 1 Drawing Sheet

| | FOREIGN PATENT DOCUMENTS | | | JP | B2-2902231 | 3/1999 |
|---|---|---|---|---|---|---|
| JP | 02-312575 | * | 12/1990 | | | |
| JP | 03-019679 | * | 1/1991 | | | |
| JP | A-3-172152 | | 7/1991 | | | |
| JP | A-6-153782 | | 6/1994 | | | |
| JP | A-6-261679 | | 9/1994 | | | |
| JP | A-10-309161 | | 11/1998 | | | |

OTHER PUBLICATIONS

"New Processed Food Technology and Apparatus", 1991, pp. 401-405, Kabushikikaisha Sangyochosakai, Japan.

* cited by examiner

FIG.1

METHOD OF PRODUCING A PRESS-MOLDED DRIED FOOD MATERIAL

CROSS-REFERENCE TO RELATED APPLICATIONS

This application is based upon and claims the benefit of priority from the prior Japanese Patent Application No. 2003-356603 filed on Oct. 16 in 2003, Japanese Patent Application No. No.2004-000642 filed on Jan. 5 in 2004, and Japanese Patent Application No. No.2004-198595 filed on Jul. 5 in 2004, the entire contents of which is incorporated herein by reference.

BACKGROUND OF THE INVENTION

1. Field of the Invention

This invention relates to a molded dried food material which can be preserved at normal temperature, exhibits favorable rehydrate property with full of voluminous feeling when rehydrated, maintaining excellent taste, color and eat feeling without permitting the shape to be collapsed.

2. Description of the Related Art

Nowadays, a lot of instant foods such as instant noodles, instant soup and the like are available in the market, and the demand for the dried food materials mainly used as ingredients for the instant foods is increasing dramatically. Accompanying with an increase in the demand, the consumers who prefer natural quality are demanding dried food materials of quality close to natural taste and eat feeling.

The dried food materials have heretofore been dried with the hot air or have been freeze-dried to contain water in amounts of no more than 8% or no more than 5%. However, the foods dried with the hot air of the former method tend to develop a brown color due to drying with the hot air and cannot maintain colors inherent within the food materials. When dried with the hot air, causing to remain no gap within plant structures due to removal of free state water and the water in a bound state condition which is bound to constitute the plant structure. Once rehydrated back upon eating, the food materials are not rehydrated back to their initial states even cooked after several to a dozen or so minutes, giving its texture with hard to chew.

As compared to the foods dried with the hot air, on the other hand, the freeze-dried foods can be suppressed from developing a brown color to some extent. When rehydrated for eating, however, the food materials tend to become too soft losing the feeling of eating inherent to the food materials. This is because, when the food material has a high initial water content, large ice crystals developed during the freeze-drying process causing to damage the plant structure. When rehydrated back for eating, causing the food material to become soft without producing the so-called texture to eat. Besides, the "bulk specific gravity" described as the weight per a predetermined volume, is very small and light weighted which in turn causing in difficulty handling the packaging of small unit, as given example for packaging an one serving meal unit.

Specifically for food materials having large initial water content, for example, leafy vegetables, reducing its weight to its ⅒ to ¹⁄₂₀ of the initial weight, becoming very light weighted, when dried to remove most of all water contained within. This light weight becomes a barrier against the packaging in a small unit. When a dry product is produced while maintaining the shape, the voids increase while the weight decreases, and a "bulk specific gravity" decreases. This state becomes conspicuous in the case of the freeze-dried product. When the food material of a s mall unit is packaged in this state of condition, it will cause the dried products to float during process of packaging with troubles such as adhesion to the packaging material due to static electricity and biting at the time of sealing causing further inconvenience for production process.

When put to the rehydration, further, the rehydrated dried product and the freeze-dried product maintain the same sizes as when they are dried or are swollen to some extent. Besides, these products are very brittle since no treatments have been performed to prevent its shape from collapsing. Therefore, the products tend to lose its shape when they are shipped in bulk, and cannot hold the shape even when they are treated during the mold process. Besides, the products involve many problems such as difficult preservation at normal temperature.

Through the air drying method or the freeze-drying method alone as described above, unable to obtain a molded dried food material which can be preserved at normal temperature, exhibiting good rehydrating property without permitting the shape to be collapsed. Besides, the dried food materials obtained by the above methods do not retain its taste, color or eat feeling, not giving satisfaction to the customer preference. Therefore, it is assigned duty for professionals in this field to research and develop molded dried food materials which can be preserved at normal temperature, exhibit good rehydrating property, and retain excellent taste, color and eat feeling.

JP-A-10-309161, JP-A-6-153782 and Japanese Patent No. 2902231 disclose the inventions that try to solve the above problem. The inventions disclosed in these patent documents are all concerned to a combination of the air drying method and the freeze-drying method. More specifically, these inventions are related to dried food materials such as vegetables obtained through air dried and, then, through the freeze-drying, in an attempt to develop dried food materials having good rehydrating property while retaining its excellent taste, color and eat feeling.

JP-A-6-261679 teaches an invention related to a molded dried food material obtained by molding the food material by using a paste followed by freeze-drying. According to this invention, the once molded state is maintained to suppress the collapse of shape to some extent.

Further, JP-A-3-172152 discloses an invention related to a molded dried food material obtained by mixing the food material with a saccharoidal substance such as sugar, and compression-molding the dry product thereof. This invention provides a molded dried food material having its excellent color, eat feeling and taste.

However, the dried food materials disclosed in JP-A-10-309161, JP-A-6-153782 and Japanese Patent No. 2902231 are not provided with taste, color and eat feeling to a degree that satisfies the liking of the consumers in these days, and have not, either, been put to the treatment for preventing the collapse of shape or to the molding treatment, and cannot be said to be satisfying the consumer's requirements.

The molded dried food material disclosed in JP-A-6-261679 is not for improving the taste or the color, and is the one that is molded without being compressed or pressed. Therefore, the molded dried food material does not have a favorable rehydrating property.

Further, the molded dried food material disclosed in JP-A-3-172152 is compressed to be molded with a pressure of as large as about 200 kg/cm² causing the structure within the plant to be destroyed and the food is not expected to rehydrate back quickly, even after the hot water is poured on.

Besides, no added treatment performed after the compression molding and, hence, the molded state is not maintained to a sufficient degree.

As described above, there has not yet been provided a molded dried food material that can be preserved at normal temperature, that has favorable rehydrating property, excellent taste, color and eat feeling, and not permitting the shape to be collapsed. Therefore, it is an urgent issue imposed for professional in this field to provide the above-mentioned dried food materials for the consumers.

SUMMARY OF THE INVENTION

After studying the above problems, the present inventors have pursued for an optimum state of conditions for combining of the air drying and freeze-drying and have also put their focus on studying technical thought to new discovery of "imparting folding property by drying" along with "hold in the molded state". As a result, the inventors have established optimum conditions for combining the air drying and the freeze-drying, having to discover t hat the dried food material can be obtained with preserving capability at normal temperature condition for retaining its excellent taste, color and eat feeling, and also established a good rehydrating property without collapsing its shape which can be obtained as a result of pressure molding with added vehicle prior to the freeze-drying, completing the present invention.

More specifically, the invention provides the following method.

(1) A method of producing a dried food material comprising the steps of:
  blanching a food material to be treated to obtain a blanched food material;
  mixing a vehicle to the blanched food material to obtain a vehicle-mixed food material;
  drying the vehicle-mixed food material with the hot air until its weight becomes no less than 20% but not more than 70% to obtain a rehydrated dried food material;
  press-molding the rehydrated dried food material to obtain a press-molded food material; and
  freeze-drying the press-molded food material to obtain a freeze-dried food material;
  wherein the said press-molding process may be conducted with a sufficient force enough to rehydrate back said freeze-dry processed food material when rehydrated.
(2) A method of producing a dried food material as described in (1), wherein the pressure is to be no less than 0.05 kg/cm$^2$ but no more than 0.50 kg/cm$^2$.
(3) A method of producing a dried food material as described in (1) or (2), wherein the food material consisting highly bulkiness with high water content.
(4) A method of producing a dried food material as described in any one of (1) to (3), wherein the food material is selected from the group consisting of vegetables, mushrooms and seaweeds.
(5) A method of producing a dried food material as described in any one of (1) to (4), wherein the vehicle used in process is saccharides.
(6) A method of producing a dried food material as described in any one of (1) to (5), wherein the vehicle is mixed in an amount of no less than 1% but no more than 10% of the weight of the food material to be treated.
(7) A method of producing a dried food material as described in any one of (1) to (6), wherein the said process of drying with the hot air is conducted while softening the vehicle-mixed food material.
(8) A method of producing a dried food material as described in any one of (1) to (7), wherein said press molding process conducted in a container sectionalized into small units by a frame.
(9) A dried food material produced by a method of producing a dried food material as described in any one of (1) to (8).
(10) A dried food material wherein the weight of the dried food material per a unit volume after rehydration to be no less than 1.4 g/cm$^3$ but no more than 5.0 g/cm$^3$.
(11) A method of producing a dried food material wherein a vehicle is mixed into the food material which is, then, press-molded to prevent the collapse of shape of the dried food material.
(12) A method of producing a dried food material wherein a vehicle is mixed into the food and press-molded to impart a heavy weight to the dried food material per a unit volume after rehydrated.
(13) A method of producing a dried food material by drying with the hot air after adding a vehicle, discontinuing said process of drying with the hot air as the food material with added vehicle become softened upon press-molded, and freeze-drying the food material after it has been press-molded.
(14) A method of transporting a dried food material by drying it with the hot air after adding a vehicle, discontinuing said process of drying with the hot air as the food material with added vehicle become softened upon press-molded, and freeze-drying the food material after it has been press-molded.

DETAILED DESCRIPTION OF THE PREFERRED EMBODIMENT

This invention is related to a method of producing a dried food material based on a combination of three steps, i.e., a blanching step that has heretofore been employed, a step of drying with the hot air and a step of freeze-drying, wherein an optimum production conditions are established, and a step of mixing the vehicle and a step of press-molding are combined together. Namely, the food material to be treated is blanched so that it can be eaten and, then, a vehicle is mixed therein. The food material is, then, dried with the hot air to remove water in the free state out of the structure within the plant. Then, drying with the hot air is discontinued, and the food material is poured into a molding container of a predetermined size, and is pressed and is freeze-dried. The method of producing a dried food material according to the invention will now be described in detail.

<Food Materials to be Treated>

In the invention, there is no particular limitation on the food materials to be treated. Preferably, however, the food materials are the ones that are highly bulky and having a high water content. The object of this invention is to develop a dried food material having good rehydrating property and the effect of the invention is exhibited to a sufficient degree when the food material is bulky and has a high water content. Given specific examples for leafy vegetables such as cabbage, spinach, komatsuna, pak-choi and nozawana, as well as vegetables in the state of germination such as seedlings of peas, and flower bud plants such as cauliflower and broccoli. When the flower bud plants such as broccoli and cauliflower were dried according to the prior technique, the flower buds peeled and fell apart although it can be maintained in a state of being attached according to the present invention. Depending upon the cases, further, mushrooms and seaweeds can be preferably treated in addition to vegetables. These food materials are suitably trimmed, washed and are cut into sizes of 20 to 50 mm×20 to 50 mm depending upon the kind of food materials, and are used for producing dried food materials.

<Steps of Production>

(Step of Blanching)

The method of producing the dried food material according to the invention includes a blanching step of blanching the food material to be treated to obtain a blanched food material. In the step of blanching, the food material after trimmed and washed is cut into a predetermined size, and is subjected to the pre-treatment such as heating treatment and cooling treatment. Through the step of blanching, the food materials are turned into edible state.

(Step of Mixing a Vehicle)

After the step of blanching, a vehicle is mixed into the food material that is turned into an edible state through the blanching to obtain a vehicle-mixed food material. Here, the vehicle to be mixed is preferably saccharides. Specifically, there are used glucose and lactose, as well as monosaccharides such as fructose or disaccharides such as sucrose. It is desired to use them in combination with two or more kinds. It is desired that the kind of the vehicle is selected depending upon the food material to be treated, and the amount thereof is suitably adjusted. Desirably, the vehicle is mixed in an amount of not less than 1% but no more than 10% of the weight of the food material and, more preferably, in an amount of no less than 1% but no more than 6% of the weight of the food material. Even when the vehicle is mixed in an amount of no more than 1% or no less than 10% of the weight of the food material, it should be interpreted to be equivalent since the effect is shown to be equivalent according to the present invention. The vehicle is added and is well mixed until a homogeneous state is reached, which is followed by air dried.

(Step of Drying with the Hot Air)

After the step of mixing the vehicle, the vehicle-mixed food material is dried with the hot air to obtain the rehydration dried food material. The food material put to the step of drying with the hot air is the one having a high water content. Namely, water is vaporized in large amounts even when it is dried at a relatively high temperature, and the temperature of the product itself is not raised excessively. In the initial stage of air drying, water adhered to the food and water in a free state in the plant structure ingrate through the structure and arrive at the surface of the structure or, in many cases, at the cut surfaces where vaporization takes place. Water in the free state can be removed relatively easily giving little damage to the plant structure, and the drying is efficiently effected. When the drying with the hot air is continued in excess of the stage of removing water in the free state, water constituting the structure is removed, i.e., water in the so-called bound state is removed bringing about irreversible change and consuming a considerable amount of energy.

To maintain a state without causing serious damage to the structure, drying with the hot air must be discontinued before the process of removing water in the free state to come to stop. In this invention, attention is given to this point, and the step of air drying is discontinued in a state where water in the free state is still remaining to some extent in the plant structure, i.e., before the plant structure is irreversibly changed, and the method proceeds to a subsequent step of press-molding and a step of freeze-drying. The dried food material produced by the above production method without causing serious damage to the plant structure and can be favorably rehydrated maintaining the eat feeling inherent in the food material. Specifically with this invention, the weight of the vehicle-mixed food material subjected to drying process with the hot air to be reduced, preferably, no less than 20% but no more than 70% and, more preferably, no less than 20% but no more than 40%. When the weight of the vehicle-mixed food material is decreased to be no less than 70%, water remains much in the free state, and crystals of ice may form in the subsequent step of dry-freezing to damage the plant structure. When the weight of the vehicle-mixed food is reduced to no more than 20%, water in the bound state will also be removed, and favorable rehydrating property is not obtained. Even when the weight of the vehicle-mixed food material put to the step of drying with the hot air is reduced to be less than 20% or is reduced to be no less than 70%, it should be interpreted to be equivalent to the present invention as far as the effect equivalent to the invention is exhibited.

The time required for decreasing the weight of the vehicle-mixed food material put to the air dried step to be no less than 20% but no more than 70%, is nearly one-half the cycle for obtaining the dried food material by air dried with the hot air only. After having to remove the water in the free state which is relatively easy to remove in the air drying step, the method is shifted to the step of freeze-drying which offers cost advantage.

Further, the step of drying with the hot air may be affected while softening the vehicle-mixed food material that is put to the step of air drying. When the vehicle-mixed food material is dried while being softened, the drying is enhanced and, besides, the food material is curled making it possible to impart more favorable rehydrating property.

(Step of Press-Molding)

Next, air dried food material is put to the press-molding treatment to obtain a press-molded food material. The press-molding is a treatment that was not so far employed in the production of dried food materials, and is employed in this invention based on a new technical idea of "imparting folding property by drying". Specifically speaking, the rehydration dried food material is introduced into a container for molding called molding tray, and is pressed. It is desired that the pressure applied to the food material at the time of press treatment is in a range of no less than 0.05 kg/cm$^2$ but no more than 0.50 kg/cm$^2$ and, more preferably, in a range of no less than 0.11 kg/cm$^2$ but no more than 0.23 kg/cm$^2$. When the pressure is not more than 0.05 kg/cm$^2$, it is difficult to maintain the molded state of the product after drying, although the effect of the press treatment is not exhibited. When the pressure is no less than 0.50 kg/cm$^2$, solidly molded state of the product is maintained after drying but cannot be expected to quickly rehydrate within several minutes when it is put to the rehydration. Besides, the vegetable structure is not rehydrated favorably in a state of being strongly pressed, and a so-called crispy structure is not obtained. The rehydrated dried food material put to the step of press-molding exhibits adhesiveness due to the vehicle that is added through the vehicle-mixing step to the water remaining in a free state and is dissolved therein to become viscous. Besides, the food material has flexibility to a considerable degree and maintains the molded state sufficiently enduring the press-molding treatment. Therefore, upon putting the hot air-dried food material to the press-molding step, the molded shape is maintained even after having passed through the freeze-drying step. Namely, an additional value of favorable workability is imparted to the dried food material.

It is desired that the container for molding used in the step of press-molding is the one that is divided into small units by a frame. The container for molding is put to the use by the consumers. Therefore, the container divided into small units by a frame enables the dried food material to be used in small units with ease.

(Step of Freeze-Drying)

Finally, the press-molded food material is put to the step of freeze-drying to obtain a freeze-dried food material. The press-molded food material put to the step of freeze-drying has a water content of nearly 20 to 40%, and is frozen at about −30° C. by taking the presence of the vehicle into consideration. In the step of freeze-drying, the vacuum condition is set to be slightly higher than the vacuum condition that is employed for the foods in general; i.e., the food material is freeze-dried under 70 to 30 Pa maintaining the frozen state to a sufficient degree. In the step of freeze-drying, the upper limit temperature of the product is 45° C.

The press-molded food material put to the freeze-drying step has already been devoid of water in the free state due to the air drying step. Therefore, the freeze-drying is completed within a period of time shorter than the cycle for obtaining the dried food material by the freeze-drying alone and, besides, little ice crystals are formed to damage the plant structure. That is, in the present invention, the air drying and the freeze-drying are combined together under optimum conditions to utilize their advantages to a maximum degree and to compensate their defects. After treated with press-molding process, the freeze-drying process may be added to maintain the molded state for extended periods of time to effectively preventing the shape to collapse.

Figure 1:
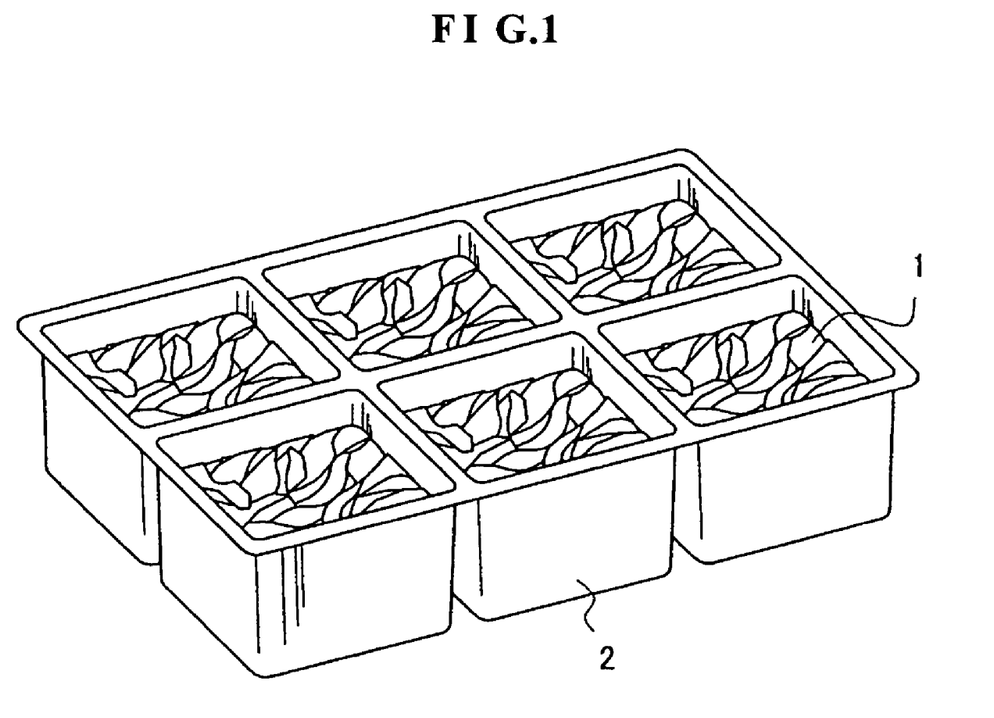
FIG. 1 is a perspective view of a dried food material according to the invention.

The molded dried food material obtained through the above steps has appearance as shown in FIG. 1, i.e., has a compact shape with a suitable degree of rigidity exhibiting a relatively large massive feeling without permitting the shape to be collapsed. The water content is 2 to 3%, and good taste, color and eat feeling inherent in the food material are maintained. The food material is quickly rehydrated with hot water in one to two minutes, and is expanded into several times of the molded state to exhibit so-called voluminous appearance. There is no change in the nutrient components as a matter of course. Besides, since the water content is low, the food material can be preserved at normal temperature. If preserved by shutting light off with sealed condition, the food material can be preserved for two or longer years without causing to change in the quality which can be handled at ease.

<Weight Per a Unit Volume of the Dried Food Material After Rehydrated>

The dried food material produced by the production method of the invention has a very heavy weight per a unit volume after rehydrated. Specifically speaking, the weight of the dried food material produced by the invention per a unit volume after rehydration is no less than 1.4 g/cm$^3$ but no more than 5.0 g/cm$^3$. Here, the weight of the dried food material per a unit volume after rehydration is obtained in accordance with the following formula 1, Weight of dried food material per a unit volume after rehydrated (g/cm$^3$)=(weight after rehydrated (g)/(weight before rehydrated (g))×bulk specific gravity (g/cm$^3$)  1

<Transporting the Dried Food Material>

As described above, the dried food material produced by the production method of the invention has a very heavy weight per a unit volume after rehydrated. By utilizing this feature of the dried food material, allowing the dried food material to be transported in large amounts. With this transportation method, would allow more efficient delivery.

According to this invention, there is obtained a molded dried food material that can be preserved at normal temperature, that has favorable rehydrating property exhibiting voluminous appearance when rehydrated, retaining excellent taste, color and eat feeling, and without permitting the shape to be collapsed.

EXAMPLES

The present invention will be described in examples as stated below, although the present invention is not particularly limited.

Example 1

Two kilograms of fresh cabbage was used. After the outermost skin and the core were removed, the cabbage was cut into an average size of 30 mm×25 mm and was washed. After the washing, thick venous portions and portions that transmit small amount of heat through the heat treatment within short periods of time were removed to obtain cabbage in an amount of 1640 g. Then, the blanching was effected at 98° C. for 100 seconds, followed by cooling with water down to 20° C. or lower and centrifugal dehydration for 2 minutes to obtain blanched cabbage in an amount of 1430 g. Glucose in an amount of 28.6 g and lactose in an amount of 28.6 g accounting for 2% of the weight of the blanched cabbage were added and were mixed well, and the cabbage was left to set still for 30 minutes to obtain the vehicle-mixed cabbage in an amount of 1470 g, which was, then, dried with the hot air. The drying with the hot air was conducted under the conditions with a load of 40 kg/m$^2$ (calculated) and 70° C. The drying with the hot air was conducted with occasional stirring. After 100 minutes have passed, the weight reduced to 440 g accounting to nearly 30% of the initial weight, and the drying with the hot air was discontinued. The cabbage was then left to set still for 30 minutes in a manner which the water is uniformly distributed throughout. Then, the cabbage was charged into a molding tray having an opening size of 30 mm×30 mm and a depth of 20 mm in a manner that each frame was filled with 15 g of cabbage. The cabbage was then strongly pressed such that the thickness would become approximately 15 mm. The press-molded cabbage obtained by pressing was frozen at −30° C. After frozen, the cabbage was freeze-dried under a vacuum condition of 60 Pa to obtain a molded dried food material with each unit consisting approximately 26 mm (length)×26 mm (width)×14 mm (depth), average weight of 3.7 g and a water content of 2.1%.

The dried food material obtained in Example 1 exhibited vivid color, well maintained molded state and developing crispy taste to exhibit voluminous appearance within a period of time as short as about one minute after hot water was poured.

When rehydrated, the dried food material multiplied by 5 to 10 times in its volume, which in turn gram of dried food material accounts to approximately 20 g of raw cabbage.

Example 2

Three kilograms of fresh broccoli was used. Stem portions were removed 15 mm under the flower bud portions to obtain flower bud portions in an amount of 1510 g. The flower bud portions were washed, blanched at 90° C. for 120 seconds, cooled, and were centrifugally dehydrated for 2 minutes to obtain blanched broccoli in an amount of 1500 g. Glucose in an amount of 30 g and lactose in an amount of 30 g corresponding to 2% of the weight of the blanched broccoli were added thereto and were mixed well, and the broccoli was left to stand still for 30 minutes to obtain the vehicle-mixed broccoli in an amount of 1540 g, which was, then, dried with the hot air. The drying with the hot air was conducted under the conditions of a load of 30 kg/m$^2$ (calculated) and 70° C. The drying with the hot air was conducted with occasional stirring. After 45 minutes have passed, the weight has decreased to 585 g corresponding to nearly 38% of the initial weight, and the drying with the hot air was discontinued. The broccoli was then left to stand still for 30 minutes so that the entire water distribution would become uniformed. Then, the broccoli was charged into a molding tray having an opening size of 30 mm×30 mm with a depth of 20 mm in a manner that each frame was filled with 15 g of broccoli. The broccoli was then strongly pressed such that the thickness was about 15 mm. The press-molded broccoli obtained by pressing was frozen at −30° C. After frozen, the broccoli was freeze-dried under a vacuum condition of 60 Pa to obtain a molded dried food material wherein dimension of each unit measured approximately 26 mm (length)×26 mm (width)×14 mm (depth) with having its average weight of 3.4 g and a water content of 3.0%.

The dried food material obtained in Example 2 exhibited vivid green color. When hot water of not lower than 90° C. was poured, the dry food was rehydrated within a period of time as short as about one and a half minutes as if flowers bloomed. Small portions of the flower buds were peeled off and developed enough taste of crispiness.

Example 3

Three kilograms of fresh spinach grown to about 30 cm was used. Root portions were removed by cutting the spinach at a portion 1 cm over the root portions and other inedible portions were removed to obtain spinach in an amount of 2610 g. The spinach was then washed and cut into 3 cm and was blanched at 98° C. for 120 seconds. The spinach was, then, cooled with water, and was centrifuged to be dehydrated for 2 minutes to obtain blanched spinach in an amount of 2200 g. Glucose in an amount of 110 g and lactose in an amount of 110 g accounts to 5% of the weight of the blanched spinach were added thereto and were mixed well, and the spinach was left to set still for about 40 minutes to obtain the vehicle-mixed spinach in an amount of 2380 g, which was, then, dried with the hot air. The drying with the hot air was conducted under the conditions with a load of approximately 10 kg/m$^2$ (calculated) and 70° C. The drying with the hot air was conducted with occasional stirring. After about 35 minutes have passed, the weight has decreased to 1300 g which was 55% of the initial weight, and the drying with the hot air was discontinued. The spinach was then left to stand still for 30 minutes so that the entire water distribution was uniformed. Then, the spinach was charged into a molding tray having an opening size of 30 mm×30 mm and a depth of 20 mm (8×10 surface constitution: the area was nearly 880 cm$^2$) in a manner that each frame was filled with 16 g of spinach. After filled, an iron plate of 150 kg was placed on the whole food material (pressure: 150 kg/880 cm$^2$=0.17 kg/cm$^2$) and the food was left to stand still for 2 minutes. After the surface was uniformed by pressing, the spinach was frozen at −25° C. After frozen, the spinach was freeze-dried under a vacuum condition of 90 Pa to obtain a molded dried food material wherein dimension of each unit measured approximately 27 mm (length)×27 mm (width)×18 mm (depth) with having its average weight of 5.1 g with a water content of 3.0%.

When rehydrated by pouring hot water heated at not lower than 90° C., the dried food material obtained in Example 3 assumed to be at edible state in about 2 minutes. After rehydrated, the food material expanded to a degree that was considered enough to be as a one serving meal of an instant noodle which had rehydrated a spinach back to exhibit good bite feeling.

Example 4

There were provided fresh rape blossoms having flower buds mostly in a bud state though some were blooming (vegetable belonging to Cruciferae developing flower buds and in an edible state). The rape blossoms were cut into a length of nearly 25 cm inclusive of the leaf portions to obtain fresh rape blossoms that have been cut in an amount of 2.8 kg. The lower portions of the thus cut rape blossoms were cut at portions of 1 cm from the cut portions and were discarded and other inedible portions were further cut and removed to obtain rape blossoms in an amount of 2460 g. The flower bud portions were cut at a length of 3 cm and were sorted into leaf and stem portions, which were, then, washed. The leaf and stem portions were further cut into 3 cm. In a state of being sorted, the blanching was effected at 98° C. for 150 seconds, cooled with water, and were centrifugally dehydrated for 2 minutes to obtain blanched flower bud portions of rape blossoms in an amount of 260 g and blanched leaf/stem portions in an amount of 1950 g. Glucose in an amount of 13 g and lactose in an amount of 13 g corresponding to 5% of the weight of the blanched flower bud portions of rape blossoms were added and were mixed well. Further, glucose in an amount of 97.5 g and lactose in an amount of 97.5 g accounts for 5% of the weight of the blanched leaf/stem portions of the rape blossoms were added and were mixed well. After mixed, they were left to stand still for 45 minutes to obtain the vehicle-mixed rape flower bud portions in an amount of 280 g and leaf/stem portions thereof in an amount of 2100 g, which were, then, dried with the hot air. The drying with the hot air was conducted under the conditions of a load of 12 kg/m$^2$ (calculated) and 70° C. The drying with the hot air was conducted with occasional stirring. After about 40 minutes have passed, the weight of the flower bud portions has decreased to 170 g corresponding to 61% of the initial weight and the weight of the leaf/stem portions has decreased to 1240 g corresponding to 59% of the initial weight, and the drying with the hot air was discontinued. They were then left to stand still for 40 minutes so that the entire water distribution was uniformed. After the water distribution was uniformed, the total of flower bud portions and leaf/stem portions was charged into a molding tray having an opening size of 36 mm×40 mm and a depth of 20 mm (8×7 surface constitution: the area was about 880 cm$^2$) in a manner that each frame was filled with 25 g of the flower bud portions and leaf/stem portions. One or more flower bud portions were introduced into each frame. Then, a iron plate of 150 kg was placed on the whole food material (pressure: 150 kg/880 cm$^2$=0.17 kg/cm$^2$) and the food material was left to stand still for 2 minutes. After the surface was uniformed, the food material was frozen at −25° C. After frozen, the food material was freeze-dried under a vacuum condition of 80 Pa to obtain a molded dried food material with dimension of each unit measured approximately 34 mm (length)×38 mm (width)×18 mm (depth) having its average weight of 6.1 g with a water content of 2.8%.

When rehydrated by pouring hot water heated at not lower than 90° C., the dried food material obtained in Example 4 exhibited voluminous appearance developing crispy eat feeling. Further, the rehydrated food material could be well arranged on a plate which could be served as boiled greens with dressing.

Example 5

There were prepared fresh shiitake mushroom, agaric, nettle tree mushroom and champignon mushroom boiled in water (the names of the mushrooms are those used for the products in the market). As for shiitake mushroom, the stem portions were removed, and the so-called umbrella portions only of the fresh shiitake mushroom of diameters of 5 cm to 7 cm were washed. After washed, the umbrella portions of nearly a circular shape were cut into halves and were sliced maintaining a width of 4 mm to 5 mm. There was further used fresh agaric of a height of about 7 cm to about 10 cm. After having removed hard tips of the stems, the agaric was washed, cut nearly into one-half such that a maximum length was 5 cm, and was sliced into a width of 4 mm to 5 mm without determining the direction. There was further used fresh nettle tree mushroom having an overall length of about 15 cm to about 18 cm and a diameter of 6 cm to 8 cm. The fresh nettle tree mushroom was cut at positions 5 cm from the lower portions to remove the root portions. The upper portions were cut nearly into one-half into a length of 4 cm to 5 cm and were digested into flakes. There was further used champignon mushroom boiled in water having umbrella portions of a diameter of 6 mm to 7 mm and an overall length of not longer than 30 mm, and from which the water was drained by using a metal gauze basket. The above four kinds of mushrooms were washed, and from which the water was drained, followed by washing and draining of water. Thereafter, the mushrooms were mixed at an equal weight ratio to obtain mixed mushrooms in an amount of 2000 g. The amounts of the starting mushrooms were 680 g of shiitake mushroom, 550 g of agaric and 650 g of nettle tree mushroom. The mixed mushrooms were blanched at 98° C. for 45 seconds, lightly cooled with water so as to be easily handled, and were put to the centrifugal separation for 3 minutes to obtain mixed mushrooms that have been blanched in an amount of 1650 g. Then, glucose in an amount of 49.5 g and lactose in an amount of 49.5 g corresponding to 3% of the weight of the blanched and mixed mushrooms were added thereto and were mixed well. After mixed, the mushrooms were left to stand still for 40 minutes and were dried with the hot air in a state where 1730 g of the mixed mushrooms were secured by laying a cloth having a mesh of about 1 mm. The drying with the hot air was conducted under the conditions of a load of about 20 kg/m$^2$ (calculated) and 70° C. After about 45 minutes have passed, the mushrooms reducing its weight to 1200 g accounts to 69% of the initial weight, and the drying with the hot air was discontinued. They were then left to stand still for about 60 minutes so that the entire water distribution was uniformed. The drying with the hot air was conducted with the occasional stirring. The nettle tree mushroom has entangled other mushrooms. The mixed mushrooms were charged into a molding tray having an opening size of 30 mm×30 mm and a depth of 20 mm (8×10 surface constitution: the area was about 880 cm$^2$) in a manner that each frame was filled with 15 g of the mixed mushrooms of all kinds. Then, a iron plate of 150 kg was placed on the whole food material (pressure: 150 kg/880 cm$^2$=0.17 kg/cm$^2$) and the mushrooms were left to set still for 2 minutes. After the surface was uniformed, the mushrooms were frozen at −25° C. After frozen, the mushrooms were freeze-dried under a vacuum condition of 80 Pa to obtain a molded dried food material with dimension of each unit measured approximately 28 mm (length)×28 mm (width)×19 mm (depth) with having its average weight of 3.1 g with a water content of 2.8%.

The molded dried food material of mixed mushrooms obtained in Example 5 was slightly inferior to the dried food materials of other leafy vegetables although maintained its shape to a sufficient degree. When rehydrated by pouring hot water of not lower than 90° C., the whole food material spread and assumed an edible state in two minutes. The food material further exhibited favorable texture to eat and could be used as an ingredient for a variety of soups and as an ingredient for Chinese noodles.

Example 6

Fresh komatsuna normally harvested was cut at portions 2 cm over the root portions and was washed after inedible portions such as dead leaves, discolored leaves and worm-eaten spots were removed. The komatsuna was then cut into a size of 40 mm×30 mm and was blanched at 98° C. for 180 seconds, and was cooled with water and centrifugally dehydrated for 3 minutes to obtain the blanched komatsuna. Glucose and lactose in amounts corresponding to 5% of the weight of the blanched komatsuna were added thereto and were mixed well, left to stand still for 40 minutes and were dried with the hot air after having been uniformed. The drying with the hot air was conducted under the conditions of a load of about 30 kg/m$^2$ and 80° C. with occasional stirring. After about 50 minutes have passed, the weight of the komatsuna has decreased to 68% of the initial weight, and the drying with the hot air was discontinued. The komatsuna was then left to stand still for not less than 30 minutes so that the entire water distribution was uniformed. Further, fresh Welsh onion normally harvested (raw material of general Kujo fine onion) was cut at portions 2 cm above the root portions and was washed after inedible portions such as dead leaves, discolored leaves and worm-eaten spots have been removed. The Welsh onion was then cut at right angles with the direction of fibers with maintaining its width of 4 mm to 5 mm, and blanched at 98° C. for 30 seconds, to be cooled off with water and centrifuged to be dehydrated for 3 minutes to obtain the blanched Welsh onion. Glucose and lactose in amounts accounting to 3% of the weight of the blanched Welsh onion were added and were mixed well, left to set still for 40 minutes and were dried with the hot air after having been uniformed. The drying with the hot air was conducted under the conditions with a load of approximately 20 kg/m$^2$ (calculated) and 70° C. with occasional stirring. After about 30 minutes have passed, the weight reduced to 61% of the initial weight, and the drying with the hot air was discontinued. The Welsh onion was then left to stand still for not less than 30 minutes so that the entire water distribution became uniformed. There was further used a normally harvested carrot without leaves. After lightly washed and after having removed inedible portions such as top portions and hair roots, the carrot was washed. The carrot was then cut into strips of a standard size of 3 mm×3 mm×30 mm, heated in a mixed solution of 1% concentrated soy sauce and 0.05% concentrated vitamin C at 98° C. for 150 seconds, and were pulled up. The carrot was not cooled with water but was left to cool and was centrifuged to be dehydrated for 2 minutes to obtain the blanched carrot. Sugar in an amount corresponding to 5% of the weight of the blanched carrot was added, mixed well, and the food material was left to stand still for 40 minutes so as to be uniformed. Then, drying with the hot air was conducted under the conditions with a load of approximately 20 kg/m$^2$ (calculated) and 70° C. After 35 minutes have passed, the weight has decreased to 68% of the initial weight, and the drying with the hot air was discontinued. The carrot was left to stand still for 30 minutes so that the water distribution was uniformed. 15 grams of the komatsuna obtained as described above, 5 g of the Welsh onion and 3 g of the carrot as well as 0.5 g of a commercially available dry seaweed (when rehydrated, the standard size is 20 mm×20 mm) were mixed together, and the total of 23.5 g of the mixture was poured into a molding tray having its opening size of 36 mm×40 mm with a depth of 20 mm (8×7 surface constitution: the area was about 880 cm$^2$). Then, a iron plate of 150 kg was placed on the whole food material (pressure: 150 kg/880 cm$^2$=0.17 kg/cm$^2$) and the food material was left to set still for 2 minutes. After the surface was uniformed, the food material was frozen at −25° C. After frozen, the food material was freeze-dried under a vacuum condition of 70 Pa to obtain a molded dried food material wherein dimension of each unit measuring approximately 34 mm (length)×37 mm (width)×18 mm (depth) with having its average weight of 6.8 g with a water content of 2.6%.

When rehydrated by pouring hot water of not lower than 90° C., the dried food material obtained in Example 6 expanded to a sufficient degree and could be eaten in about 2 minutes. After rehydrated, the vegetables exhibited good bite feeling, vivid green and red colors, and could be used as an ingredient for a cup of instant miso soup.

Example 7

Fresh broccoli normally harvested was used after having removed white flower bud portions and other discolored flower bud portions. The broccoli was cut at portions 1 cm under the flower bud portions such that the width of the flower buds became 2 cm to 3 cm, and was washed. Then, the broccoli was put to the primary blanching at 98° C. for 60 seconds, and was cooled with water and was put to the treatment for sorting foreign matter from the softened flower buds of broccoli. After the sorting, the broccoli was put to the secondary blanching at 98° C. for 180 seconds, cooled with water and was centrifugally dehydrated for 2 minutes to obtain the blanched broccoli. Glucose and lactose in amounts corresponding to 2% of the weight of the blanched broccoli were added and were mixed well, left to stand still for 40 minutes and were dried with the hot air after having been uniformed. The drying with the hot air was conducted under the conditions with a load of about 40 kg/m$^2$ and 70° C. with occasional stirring. After about 50 minutes have passed, the weight of the broccoli has decreased to 68% of the initial weight, and the drying with the hot air was discontinued. The broccoli was then left to stand still for not less than 40 minutes so that the water distribution became uniformed. Further, fresh cabbage normally harvested was used. After having removed the outermost leaf and the discolored portions, the leaves were peeled piece by piece. After having removed the venous portions of widths of not less than 15 mm and the core portion, the leaves were washed. Then, the cabbage was cut into a size of 40 mm×30 mm, blanched at 98° C. for 180 seconds, cooled with water and was centrifugally dehydrated for 2 minutes to obtain the blanched cabbage. Glucose and lactose in amounts accounting to 5% of the weight of the blanched cabbage were added and were mixed well, left to set still for 40 minutes and were dried with the hot air after having been uniformed. The drying with the hot air was conducted under the conditions with a load of about 35 kg/m$^2$ and 80° C. with occasional stirring. After about 45 minutes have passed, the weight has decreased to 68% of the initial weight, and the drying with the hot air was discontinued. The cabbage was then left to set still for not less than 30 minutes so that the water distribution became uniformed. 9.5 Grams of the broccoli and 6 g of the cabbage having nearly the same water distribution were weighed, and the total of 15.5 g of them were mixed on a small dish and were charged into a molding tray having its opening size of 30 mm×30 mm with a depth of 20 mm (8×10 surface constitution: the area was about 880 cm$^2$). Then, a iron plate of 150 kg was placed on the whole food material (pressure: 150 kg/880 cm$^2$=0.17 kg/cm$^2$) and the food material was left to stand still for 2 minutes. After the surface was uniformed, the food material was frozen at −30° C. After frozen, the food material was freeze-dried under a vacuum condition of 60 Pa to obtain a molded dried food material wherein dimension of each unit measured approximately 28 mm (length)×28 mm (width)×19 mm (depth) with having its average weight of 4.3 g with a water content of 3.8% after being firmly molded.

When rehydrated by pouring hot water of not lower than 90° C., the dried food material obtained in Example 7 expanded to a sufficient degree and could be eaten in about 2 minutes. After rehydrated, the food material exhibited vivid green color and good bite feeling while remained soft as a whole. In a slightly thick instant soup, the food material was rehydrated back to give its sufficient spread.

Example 8

Fresh komatsuna normally harvested was cut at portions 2 cm above the root portions. After having removed inedible portions such as dead leaves, discolored leaves and worm-eaten spots, the komatsuna was washed. Then, the komatsuna was cut into a size of 40 mm×30 mm and was blanched at 98° C. for 180 seconds, cooled with water and was centrifuged to be dehydrated for 3 minutes to obtain the blanched komatsuna. Glucose and lactose in amounts corresponding to 5% of the weight of the blanched komatsuna were added and were mixed well, left to stand still for 40 minutes and were dried with the hot air after having been uniformed. The drying with the hot air was conducted under the conditions with a load of about 30 kg/m$^2$ and 80° C. with occasional stirring. After about 50 minutes have passed, the weight of the komatsuna has decreased to 68% of the initial weight, and the drying with the hot air was discontinued. The komatsuna was then left to stand still for not less than 30 minutes so that the water distribution was uniformed. Further, fresh cabbage normally harvested was used. After having removed the outermost leaf and the discolored portions, the leaves were peeled piece by piece. After having removed the venous portions of widths of not less than 15 mm and the core portion, the leaves were washed. Then, the cabbage was cut into a size of 40 mm×30 mm, blanched at 98° C. for 180 seconds, cooled with water and was centrifuged to be dehydrated for 2 minutes to obtain the blanched cabbage. Glucose and lactose in amounts corresponding to 5% of the weight of the blanched cabbage were added and were mixed well, left to stand still for 40 minutes and were dried with the hot air after having been uniformed. The drying with the hot air was conducted under the conditions with a load of about 35 kg/m$^2$ and 80° C. with occasional stirring. After about 45 minutes have passed, the weight has decreased to 68% of the initial weight, and the drying with the hot air was discontinued. The cabbage was then left to set still for not less than 30 minutes so that the water distribution was uniformed. 8 Grams of the komatsuna and 8 g of the cabbage having nearly the same water distribution were weighed, and the total of 16 g of them were mixed on a small dish and were charged into a molding tray having its opening size of 30 mm×30 mm with a depth of 20 mm (8×10 surface constitution: the area was about 880 cm$^2$). Then, a iron plate of 150 kg was placed on the whole food material (pressure: 150 kg/880 cm$^2$=0.17 kg/cm$^2$) and the food material was left to stand still for 2 minutes. After the surface was uniformed, the food material was frozen at −30° C. After frozen, the food was freeze-dried under a vacuum condition of 60 Pa to obtain a molded dried food material wherein dimension of each unit measured approximately 28 mm (length)×28 mm (width)×19 mm (depth) with having its average weight of 4.6 g with a water content of 3.6%.

When rehydrated by pouring hot water of not lower than 90° C., the dried food material obtained in Example 8 expanded to a sufficient degree and could be eaten in about 2 minutes. After rehydrated, the food material exhibited vivid green color and good bite feeling while remained soft as a whole. In a slightly thick instant soup, the food material was rehydrated back to spread in a sufficient degree.

Example 9

Fresh komatsuna normally harvested was cut at portions 2 cm above the root portions. After having to remove inedible portions such as dead leaves, discolored leaves and worm-eaten spots, the komatsuna was washed. Then, the komatsuna was cut into a size of 40 mm×30 mm and was blanched at 98° C. for 180 seconds, cooled with water and was centrifugally dehydrated for 3 minutes to obtain the blanched komatsuna.

Glucose and lactose in amounts corresponding to 5% of the weight of the blanched komatsuna were added and were mixed well, left to set still for 40 minutes and were dried with the hot air after having been uniformed. The drying with the hot air was conducted under the conditions with a load of about 30 kg/m$^2$ (calculated) and 80° C. with occasional stirring. After about 50 minutes have passed, the weight of the komatsuna has decreased to 68% of the initial weight, and the drying with the hot air was discontinued. The komatsuna was then left to stand still for not less than 30 minutes so that the water distribution became uniformed. There was further used fresh field immatured peas pod having a length of not longer than 7 cm with peas pod not still matured in the pod. Strings and both ends were removed by cutting its length by about 5 mm. The peas pod were cut aslant at nearly the intermediate portions. The weight of the field peas after cut was 86% of the initial weight. Then, the peas pod were washed and blanched at 98° C. for 90 seconds, cooled with water and was centrifugally dehydrated for 3 minutes to obtain the blanched field peas. Glucose and lactose in amounts corresponding to 3% of the weight of the blanched field peas were added thereto and were mixed well, left to stand still for 45 minutes and were dried with the hot air after having been uniformed. The drying with the hot air was conducted under the conditions of a load of about 20 kg/m$^2$ (calculated) and 70° C. with occasional stirring. After 35 minutes have passed, the weight has decreased to 67% of the initial weight, and the drying with the hot air was discontinued. 17 Grams of the komatsuna and 8 g of the field peas having nearly the same water distribution were weighed, mixed well, and were charged into a molding tray having its opening size of 36 mm×40 mm and a depth of 20 mm (8×7 surface constitution: the area was about 880 cm$^2$). The komatsuna and the field peas pod were poured as homogeneously as possible since the portions where the field peas exist in large amounts maintaining its small portion in a dry state. Then, a iron plate of 150 kg was placed on the whole food material (pressure: 150 kg/880 cm$^2$=0.17 kg/cm$^2$) and the food was left to stand still for 2 minutes. After the surface became uniformed, the food material was frozen at −25° C. After frozen, the food material was freeze-dried under a vacuum condition of 80 Pa to obtain a molded dried food material wherein dimension of each unit accounting approximately 34 mm (length)×38 mm (width)×18 mm (depth) with having its average weight of 6.5 g with a water content of 2.6%.

When rehydrated by pouring hot water of not lower than 90° C., the dried food material obtained in Example 9 expanded to a sufficient degree and could be eaten in about 2.5 minutes. After rehydrated, the food material exhibited good bite feeling. In particular, the field peas exhibited excellent texture to eat. The food material served as a favorable ingredient for the miso soup and for the instant noodles.

Example 10

Seedlings of peas cultivated on a seedbed and grown to nearly 8 cm to 10 cm were cut at portions of about 2 cm above the root portions and were further cut at one-half portions thereof to obtain seedlings of peas of 3 cm to 4 cm in an amount of 850 g, which were then washed. Then, the seedlings of peas were blanched at 98° C. for 60 seconds, cooled with water and was centrifuged to be dehydrated for 2 minutes to obtain the blanched seedlings of peas in an amount of 720 g. Glucose in an amount of 14.4 g and lactose in an amount of 14.4 g corresponding to 2% of the weight of the blanched seedlings of peas were added and were mixed well, left to set still for 40 minutes and were dried with the hot air after having been uniformed. The weight of the seedlings of peas put to the drying with the hot air was 740 g, the drying with the hot air was conducted under the conditions of a load of about 20 kg/m$^2$ (calculated) and 70° C. with occasional stirring. After about 30 minutes have passed, the weight has reduced to 480 g which was 65% of the initial weight, and the drying with the hot air was discontinued. The seedlings of peas were then left to set still for not less than 30 minutes so that the water distribution was uniformed. The seedlings of peas of which the water distribution was uniformed were charged into a molding tray having its opening size of 30 mm×30 mm with a depth of 20 mm (8×10 surface constitution: the area was about 880 cm$^2$) being weighed into 12 g each. A iron plate of 150 kg was placed on the whole food material (pressure: 150 kg/880 cm$^2$=0.17 kg/cm$^2$) and the food was left to set still for 2 minutes. After the surface was uniformed, the food material was frozen at −25° C. After frozen, the food material was freeze-dried under a vacuum condition of 90 Pa to obtain a molded dried food material in which dimension of each unit measuring approximately 28 mm (length)×28 mm (width)×19 mm (depth) having its average weight of 3.6 g with a water content of 2.4%.

When rehydrated by pouring hot water of not lower than 90° C., the dried food material obtained in Example 10 was relaxed from the entangled state and could be eaten in about 2 minutes. After rehydrated, the amount of the food material was sufficient for a one serving meal of instant noodles and exhibited crispy texture to eat.

Comparative Examples 1 to 3

2 Kg of fresh cabbage was blanched in the same manner as in Example 1 and was dried with the hot air alone to obtain a dried food material (Comparative Example 1), or was freeze-dried to obtain a dried food material (Comparative Example 2) or was dried with the hot air and was further freeze-dried to obtain a dried food material (Comparative Example 3).

(Evaluation)

Dried food materials obtained in Example 1 and in Comparative Examples 1 to 3 by using cabbage as a food material were evaluated for their water contents, bulk specific gravities, rehydration ratios, weights per a unit volume of the dried food material after rehydrated, eat feeling, taste, colors and collapse of shape. The results were as shown in Table 1.

TABLE 1

|  | Comparative Example 1 | Comparative Example 2 | Comparative Example 3 | Example 1 |
|---|---|---|---|---|
| Water content (%) | 8.3 | 1.8 | 1.8 | 2.1 |
| Bulk specific gravity (g/cm³) | 0.43 | 0.07 | 0.24 | 0.45 |
| Rehydrating ratio (%) | 310 | 1270 | 480 | 550 |
| Weight per unit volume of dry food after rehydrated (g/cm³) | 1.33 | 0.89 | 1.15 | 2.48 |
| Eat feeling | slightly hard | very soft | close to the original food | same as the original food |
| Taste | faint odor of cabbage | odor of cabbage | odor of cabbage | vivid odor of cabbage |
| Color | slightly blurred green, locally turned into brown | pale green, no brown portion | green, no brown portion | vivid green, no brown portion |
| Collapse of shape | yes | yes | yes | no |

The water content (%) was measured by a reduced-pressure heat-drying method under 4000 Pascals (about 0.04 atms) or lower at 70° C. for 5 hours. As for the bulk specific gravities, the dried food materials obtained by Examples were measured for their weights and the volumes were measured to calculate. On the other hand, the dried food materials obtained in Comparative Examples were put into a beaker of a volume of 500 ml and were weighed. As for the rehydrating ratios, the dried food materials were weighed, hot water was poured in sufficient amounts therein and after 3 minutes have passed, water was drained using a mesh spoon. The food materials were left to set still for 10 minutes and were weighed to find rehydrating ratio in compliance with the formula 2, Rehydrating ratio=(weight after rehydrated (g)/ weight before rehydrated (g))×100    2

The weight per a unit volume of the dried food material after rehydrated was found in compliance with the formula 1 above.

As will be obvious from the results of Table 1, as compared to Comparative Examples 1 to 3, the dried food material obtained in Example 1 can be preserved at normal temperature, can be favorably rehydrated to exhibit voluminous feeling, and retains taste, color and eat feeling without permitting the shape to be collapsed.

What is claimed is:

1. A method of producing a dried food material comprising the steps of:
    blanching a food material to obtain a blanched food material;
    mixing a vehicle with the blanched food material to obtain a vehicle-mixed food material;
    drying the vehicle-mixed food material with heated air while softening the vehicle-mixed food material;
    discontinuing the drying step when the weight of said vehicle-mixed food material decreases to 20% to 70% and an amount of water in a free state remains within said vehicle-mixed food material to obtain a rehydratable dried food material;
    press-molding the rehydratable dried food material to obtain a press-molded food material; and
    freeze-drying the press-molded food material to obtain a freeze-dried food material;
    wherein the press-molding treatment performs the pressing with a force of 0.05 kg/cm² to 0.50 kg/cm².

2. A method of producing a dried food material according to claim 1, wherein the food material to be treated is selected from the group consisting of vegetables, mushrooms and seaweeds.

3. A method of producing a dried food material according to claim 1, wherein the vehicle is saccharides.

4. A method of producing a dried food material according to claim 1, wherein the vehicle is mixed in an amount to be no less than 1% but no more than 10% of the weight of the food material to be treated.

5. A method of producing a dried food material according to claim 1, wherein the step of press molding is conducted in a container divided into small units by a frame.

6. A method of producing a dried food material according to claim 1, wherein said step of discontinuing the drying step prevents irreversible changes to a structure of said vehicle-mixed food material.

* * * * *